May 25, 1971  H. S. GREEN  3,580,814
FLOATING, SEA WATER DISTILLATION APPARATUS USING A
RECIRCULATING, DIRECTLY CONTACTING
FLUENT HEATING MEDIUM
Filed March 14, 1969  4 Sheets-Sheet 1
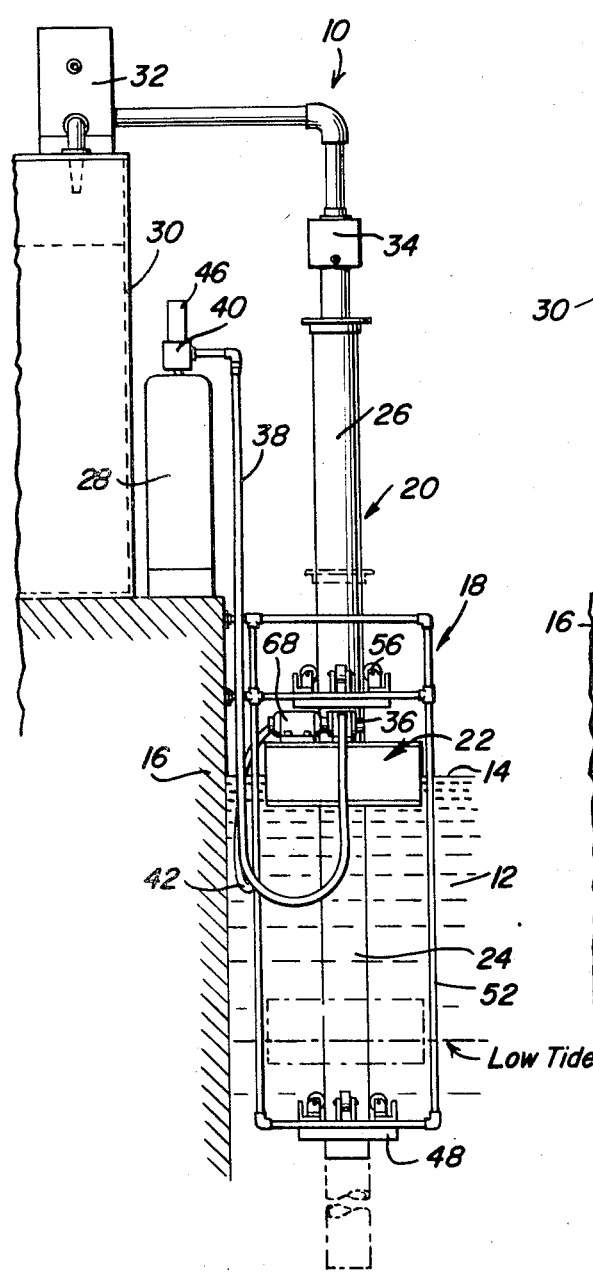
Harry S. Green
INVENTOR.
BY Clarence A. O'Brien
and Harvey B. Jacobson
Attorneys May 25, 1971

H. S. GREEN 3,580,814

FLOATING, SEA WATER DISTILLATION APPARATUS USING A
RECIRCULATING, DIRECTLY CONTACTING
FLUENT HEATING MEDIUM

Filed March 14, 1969

Harry S. Green
INVENTOR.

BY *Clarence A. O'Brien
and Harvey B. Jacobson*
Attorneys

May 25, 1971

H. S. GREEN 3,580,814

FLOATING, SEA WATER DISTILLATION APPARATUS USING A
RECIRCULATING, DIRECTLY CONTACTING
FLUENT HEATING MEDIUM

Filed March 14, 1969

Harry S. Green
INVENTOR.

BY Clarence A. O'Brien
and Harvey B. Jacobson
Attorneys

May 25, 1971

H. S. GREEN 3,580,814

FLOATING, SEA WATER DISTILLATION APPARATUS USING A
RECIRCULATING, DIRECTLY CONTACTING
FLUENT HEATING MEDIUM

Filed March 14, 1969

Harry S. Green
INVENTOR.

BY *Clarence A. O'Brien*
*and Harvey B. Jacobson*
Attorneys

United States Patent Office 3,580,814
Patented May 25, 1971

3,580,814
FLOATING, SEA WATER DISTILLATION APPARATUS USING A RECIRCULATING, DIRECTLY CONTACTING FLUENT HEATING MEDIUM
Harry S. Green, R.R. 1, Box 22A,
Wilmington, Ill. 60481
Filed Mar. 14, 1969, Ser. No. 807,253
Int. Cl. B01d 3/00
U.S. Cl. 202—234
6 Claims

ABSTRACT OF THE DISCLOSURE

Sea water, evaporated by direct contact with heated oil discharged into an insulated heat exchange tube, mounted within the lower submerged portion of a steam stack carried by a float member for vertically guided movement in response to tidal changes in the level of the sea water relative to a stationary frame. The oil rises to the top of the water within the heat exchange tube for withdrawal by a suction intake after transfer of its heat to the water. The evaporated water rises as a vapor through the steam stack to a condenser after passing through a steam trap. A pump connected to the suction intake recirculates the oil through a heater.

The invention relates to the purification of saline water and more particularly to apparatus for distilling sea water.

The present invention is concerned with economical and portable apparatus capable of rapidly converting sea water into substantially pure water by a distillation method utilizing a direct contact-type of heat exchanger. Accordingly, an important object of the present invention is to provide apparatus of the aforementioned type which is floatingly supported and partially submerged within a body of sea water for continuous operation.

In accordance with the present invention, an elongated conduit assembly or steam stack is mounted by a float member so that its lower portion is held submerged within a body of liquid. An insulated heat exchange tube mounted within the lower portion of the conduit assembly is submerged within the liquid or sea water and is provided with an exit passage located at the surface of the sea water so as to permit the outflow of a heat transfer medium such as oil which rises to the top of the water within the heat exchange tube after its heat is transferred to the water for evaporation of the water. The evaporating water rises as vapor from the heat exchange tube into the upper portion of the steam stack above the surface of the water while the oil collects above the water surface and is withdrawn through a suction tube connected to the intake side of an oil circulating pump mounted on the float member. The oil is recirculated through a heater from which the heated oil is conducted to a nozzle mounted within the heat exchange tube and from which the heated oil is discharged into direct contact with the sea water. The float member together with the steam stack assembly and the components mounted thereon are guided for vertical movement in response to changes in the level of the body of liquid by means of a guide frame assembly.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view illustrating one form of apparatus constructed in accordance with the present invention.

FIG. 2 is a front elevational view of the apparatus shown in FIG. 1.

Figure 3:
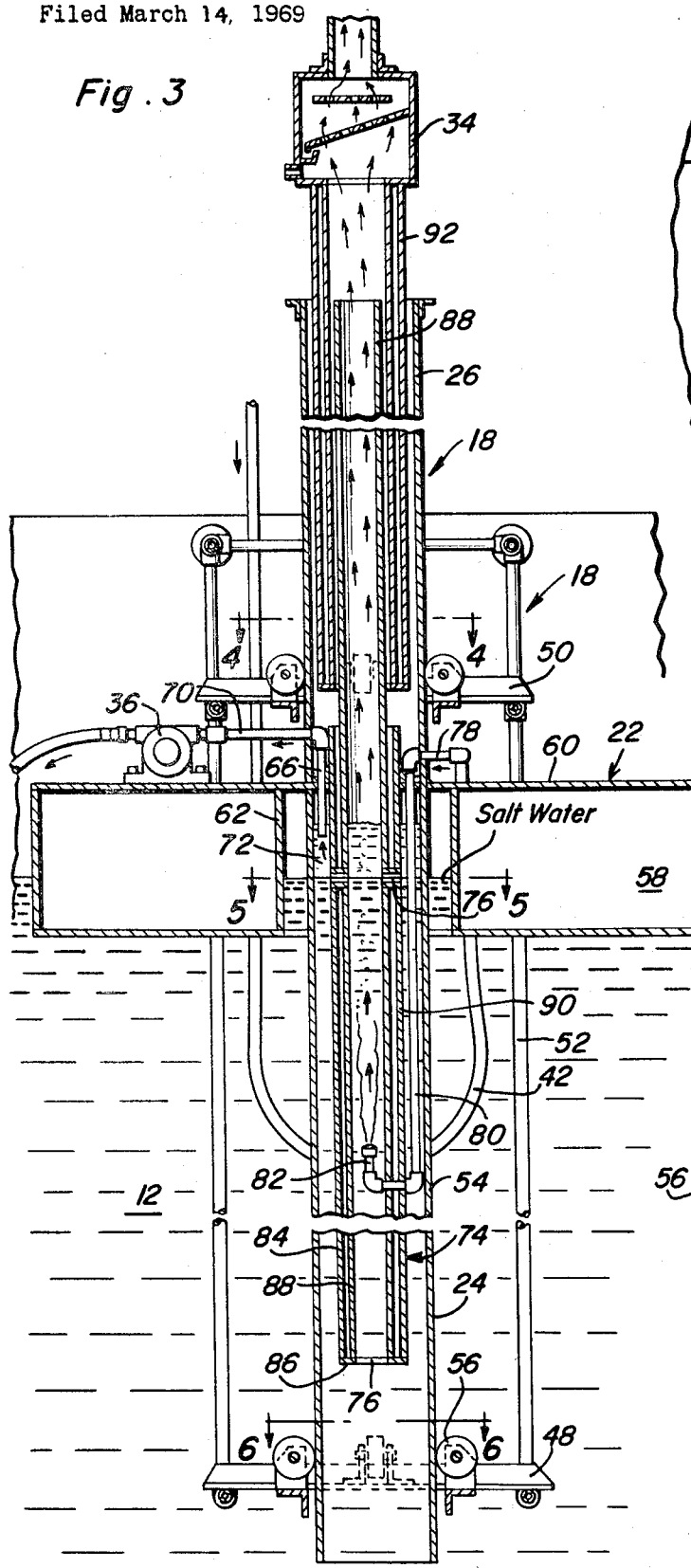
FIG. 3 is an enlarged side sectional view taken substantially through a plane indicated by section line 3—3 in FIG. 2.
Figure 4:
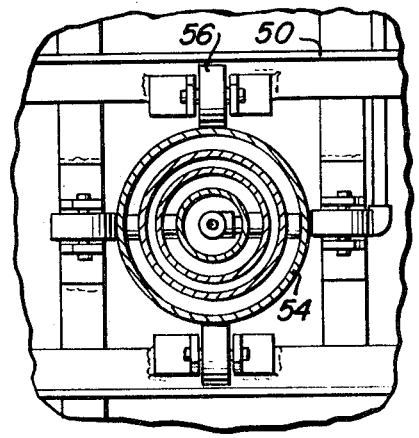
FIG. 4 is a partial transverse sectional view taken substantially through a plane indicated by section line 4—4 in FIG. 3.
Figure 5:
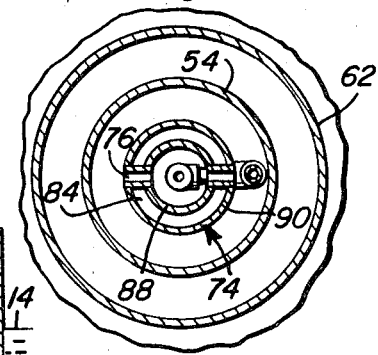
FIG. 5 is a partial transverse sectional view taken substantially through a plane indicated by section line 5—5 in FIG. 3.
Figure 6:
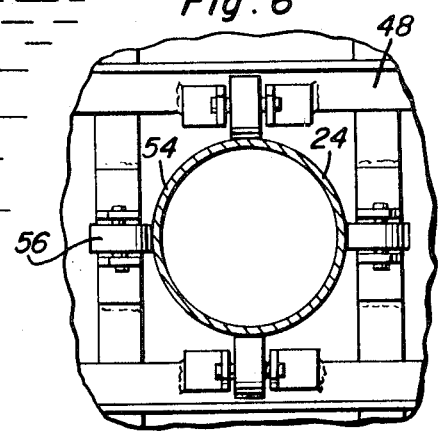
FIG. 6 is a partial transverse sectional view taken substantially through a plane indicated by section line 6—6 in FIG. 3.

Referring now to the drawings in detail, FIGS. 1 and 2 illustrate apparatus generally denoted by reference numeral 10 constituting one embodiment of the present invention. The apparatus is adapted to be operatively positioned, partially submerged within a body of liquid such as the sea water 12 which is to be converted into pure water. In connection with sea water, it will be apparent that the top surface 14 will rise and fall with tidal changes relative to the land anchored foundation 16 on which the stationary portions of the apparatus are mounted including a guide frame 18. Vertical movement of an elongated conduit assembly or steam stack 20 is guided by means of the frame 18. The steam stack 20 is therefore carried by a float member 22 so that the lower portion 24 of the steam stack always remains submerged within the water while the upper portion 26 thereof remains above the surface 14 of the water regardless of water level changes.

The apparatus 10 also includes a heater 28 mounted on the stationary foundation 16 adjacent the frame assembly 18. Also mounted on the foundation is a water storage tank 30 into which the purified or distilled water is discharged from a condenser 32 mounted on top of the tank. The condenser is a conventional piece of equipment operative to condense the water vapor conducted thereto from a steam trap 34 to which the vapor is conducted from the upper portion 26 of the steam stack. The sea water within the lower portion 24 of the steam stack is accordingly evaporated by heat exchange with a heat transfer medium supplied to the lower portion of the steam stack by a circulating pump 36 mounted on the float member 22. The discharge end of the pump is connected by a flexible return conduit 38 to a liquid separator 40 from which the heat transfer medium is conducted through heater 28. The heat transfer medium is accordingly heated within the heater 28 and then conducted by the conduit 42 to the lower portion of the steam stack. An atmospheric pressure control valve 44 is connected to the upper end of the conduit 42 while a vent tube 46 is mounted on top of the heater.

Referring now to FIG. 3 in particular, it will be observed that the guide frame assembly 18 is made up of tubular frame members to which a lower support guide 48 and an upper support guide 50 are secured respectively below and above the float member 22.

In the embodiment illustrated, the float member is generally rectangular in shape and elongated in one direction so as to extend between parallel spaced posts 52 associated with the guide frame assembly to which the support guides 48 and 50 are secured. Accordingly, the float member is free to move vertically between the posts 52 together with the elongated steam stack 12 to which it is secured. The steam stack includes an outer conduit member 54 engaged by guide rollers 56 rotatably mounted by the guide supports 48 and 50 below and above the float member. The float member is limited in vertical movement between the upper and lower support guides 50 and 48 fixedly positioned by the guide frame assembly 18 so as to accommodate changes in the level of the water surface 14 with the tides. Further, the float member is provided with an enclosed ballast chamber 58 having a volume sufficient to floatingly support the weight of the float member as well as the steam stack 18 with the lower portion 24 thereof submerged and the upper portion 26 above the surface of the body of water 12. The upper portion 60 of the float member is therefore secured as by welding to the outer conduit member 54 of the steam stack at a location above the surface 14 of the water which surrounds the steam stack therebelow radially inwardly of an inner wall 62 surrounding the steam stack to form a protected space.

A suction intake tube 66 enclosed within the conduit member 54 is connected to the intake side of the pump 36 which is mounted on the top portion 60 of the float member together with its motor 68 as shown in FIG. 1. A pump intake conduit 70 extends from the pump into the outer conduit member 54 just above the top portion 60 of the float member as shown in FIG. 3 to be connected by a right angle elbow to the suction tube 66 which is closely spaced above the level 14 of the sea water.

The suction tube 66 is in an operative position for withdrawing the heat transfer medium 72 which rises to the top surface 14 of the sea water within the outer conduit member 54. The heat transfer medium selected in accordance with one form of the invention, is vegetable oil which is less dense than and immiscible with the sea water. Further, the oil 72 has a higher boiling point temperature than that of the sea water so that it may be heated to a sufficiently high temperature capable of causing evaporation of the water as it passes in direct contact therethrough within an insulated heat exchange tube 74 mounted within the lower portion 24 of the steam stack.

As shown in FIG. 3, the insulated heat exchange tube 74 is open at the bottom 76 so that sea water may completely fill the heat exchange tube up to the surface 14. Exit passages 78 are located in the heat exchange tube at the surface level of the water so that the rising oil may be conducted therethrough and collect about the heat exchange tube above the water surface and be withdrawn from the outer conduit 54 by the suction tube 66 as aforementioned.

The heated oil is conducted to the heat exchange tube by the flexible conduit 42 as aforementioned. The flexible conduit 42 is connected by a connecting conduit 78 to a supply tube 80 at is upper end above the top portion 60 of the float member, the supply tube 80 extending downwardly through the conduit member 54 radially outwardly of the heat exchange tube 74. A discharge nozzle 82 is connected to the lower end of the supply tube 80 so as to upwardly discharge the heated oil through the sea water as shown in FIG. 3. Inasmuch as direct contact heat exchange between the oil and sea water takes place within the heat exchange tube, it is double-walled so as to form an annular insulating dead air space 84, closed at its lower end by the annular wall 86. The inner tubular portion 88 of the heat exchange tube extends upwardly beyond the upper end of the outer tubular jacket 90 into the upper portion 26 of the steam stack so as to upwardly conduct water vapor evaporated by heat exchange of the sea water with the heated oil.

The inner tube 88 within the upper portion of the steam stack is surrounded by a double walled, insulated conduit 92 the upper end of which is connected to the steam trap 34. The telescopic relationship between the insulated tube 92, the inner tube 88 and the outer conduit member 54 of the steam stack accommodates the vertical displacement of the steam stack relative to the stationary condenser 32 to which the steam trap is connected. Thus, the water vapor free of impurity-containing water particles is condensed within the condenser so as to deposit distilled water into the water storing tank 30 from the condenser outlet 94 as more clearly shown in FIG. 2.

In operation of the apparatus, the oil being heated in the heater 28 flows under the inducement of pump 36 downwardly through the conduit 42 for upward discharge from the nozzle 82 within the heat exchange tube 74. The sea water within the insulated heat exchange tube 74 is thereby heated by direct contact with the oil which rises and collects above the surface of the sea water for withdrawal through the suction tube 66 after the oil has been cooled by transfer of its heat to the sea water. The evaporating sea water flows upwardly into the steam trap 34 and is condensed within the condenser 32. The cooled oil on the other hand is conducted through the pump 36 and the flexible conduit 38 to the water and oil separator 40 before it is recirculated through the heater 28, in order to undergo another heat exchange cycle.

Figure 7:
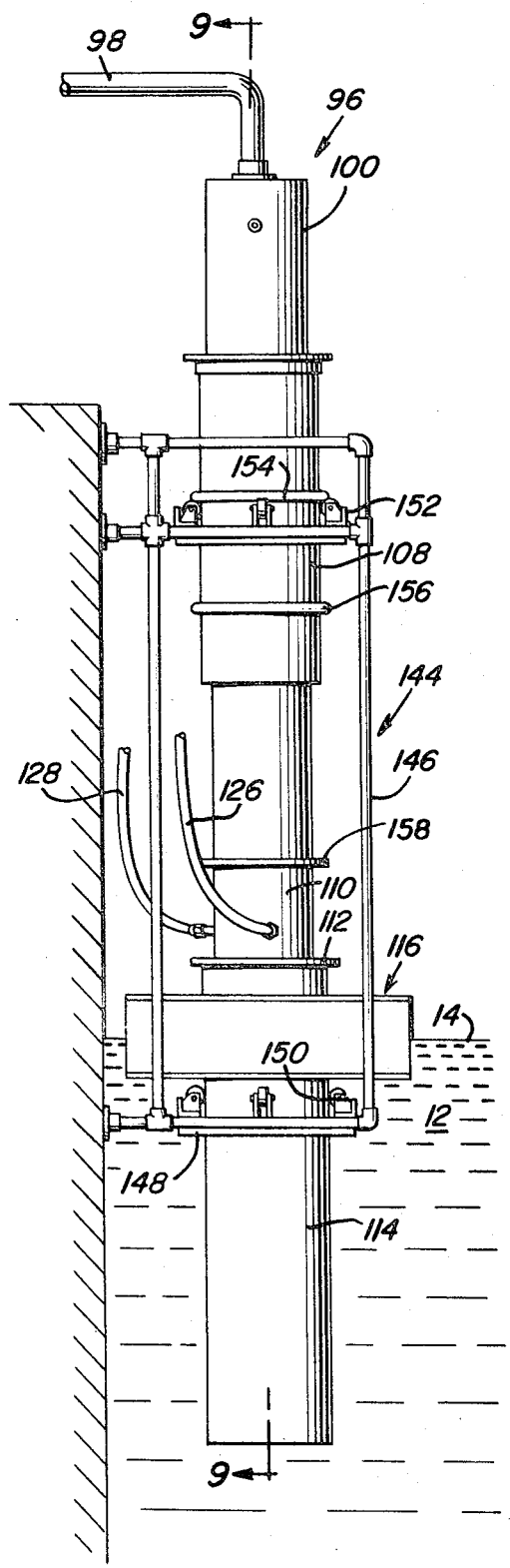
FIG. 7 is a side elevational view of another form of apparatus constructed in accordance with the present invention.
Figure 8:
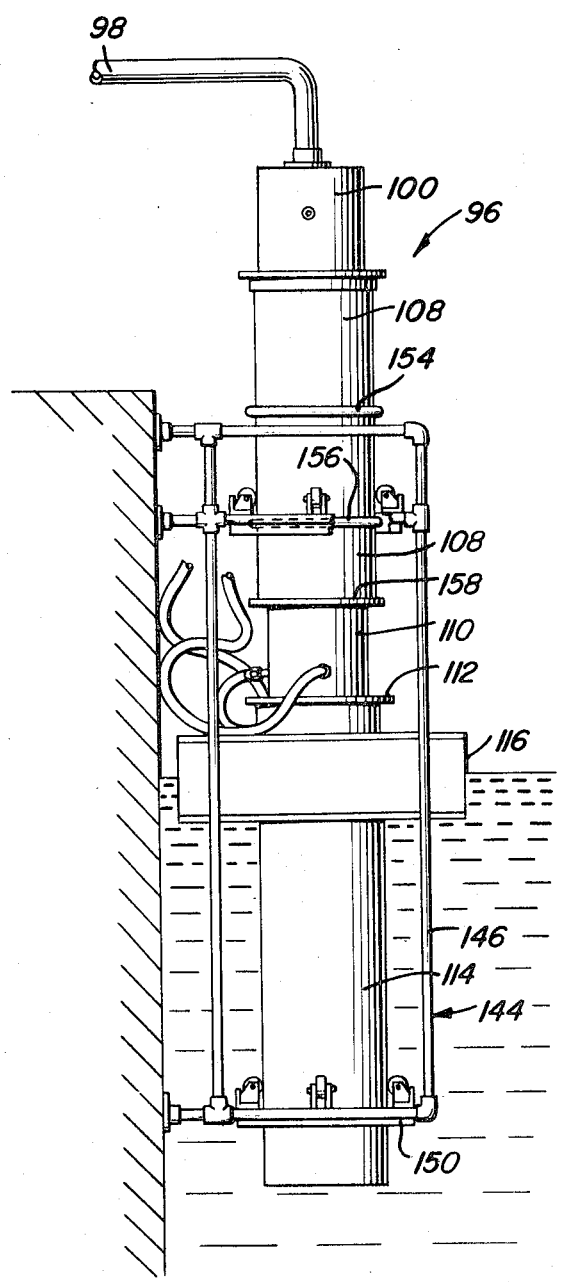
FIG. 8 is a side sectional view similar to FIG. 7 showing the apparatus in another operative position.
Figure 9:
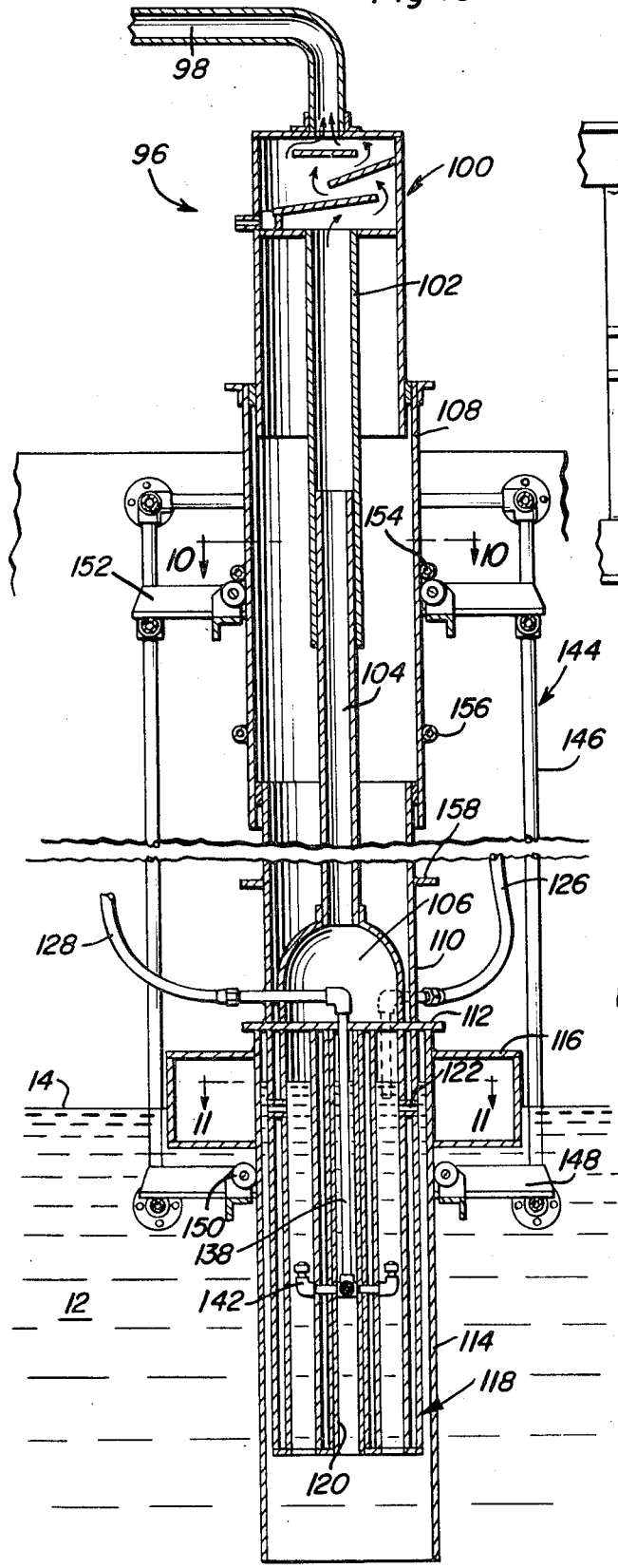
FIG. 9 is an enlarged sectional view taken substantially through a plane indicated by section line 9—9 in FIG. 7.
Figure 10:
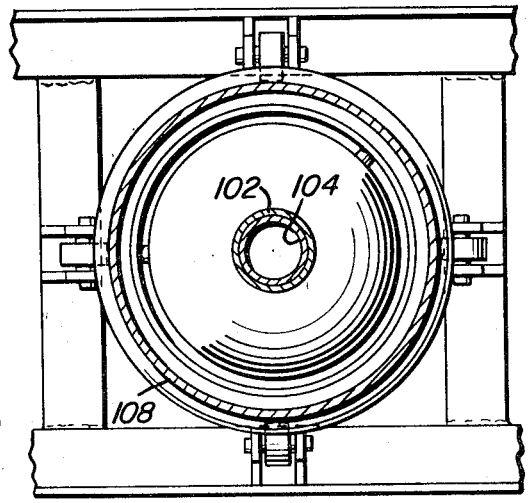
FIG. 10 is a transverse sectional view taken substantially through a plane indicated by section line 10—10 in FIG. 9.
Figure 11:
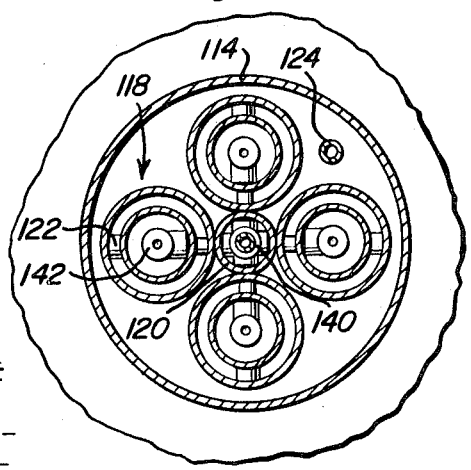
FIG. 11 is a partial transverse sectional view taken substantially through a plane indicated by section line 11—11 in FIG. 9.

FIGS. 7 through 11 illustrate another form of apparatus generally denoted by reference numeral 96 which is similar in operation to the apparatus 10 hereinbefore described in connection with FIGS. 1 through 6. An oil heater, a condenser and a distillate storing tank as hereinbefore described in connection with apparatus 10 are also associated with the apparatus 96. Accordingly, the stationary components associated with the apparatus 10 are the same as the stationary components associated with apparatus 96 including the condenser having an inlet conduit 98 connected to the upper end of the steam trap 100 as shown in FIGS. 7, 8 and 9. The steam trap is connected to an inlet conduit 102 through which vapor rises from a telescopingly received vapor conduit 104, the lower end of which is connected to a steam collecting dome 106 within the steam stack assembly which includes an upper conduit member 108 telescopingly receiving a lower conduit member 110 welded to the top flange 112 to which the dome 106 is secured. The top flange 112 is in turn connected as by welding to the upper end of an outer tubular jacket 114 supported by the float member 116 and projecting therebelow into the water 12 below the surface 14. The outer jacket 114 is opened at the bottom for receiving the sea water and encloses a plurality of insulated heat exchange tubes 118 circumferentially positioned about an inner tubular member 120 as shown in FIGS. 9 and 11. Each of the heat exchange tubes 118 is similar in construction and operation to the single heat exchange tube 74 described in connection with FIGS. 1-6 and includes an exit passage member 122 through which oil is conducted radially outwardly from the inner portion of the heat exchange tube into the space enclosed by the outer jacket 114 above the surface 14 of the sea water. A suction tube 124 extends downwardly from the top flange 112 into the space outside of the heat exchange tubes 118 closely spaced above the surface 14 of the water so as to withdraw the oil and conduct it to the intake side of the pump to which the suction tube 124 is connected by the flexible conduit 126. Heated oil on the other hand is conducted from the heater by flexible conduit 128 to a centrally located feed tube 130 extending downwardly from the top flange 112 of the outer jacket to a plurality of nozzles associated with the respective heat exchange tubes 118. The feed tube 138 extends through the inner tubular member 120 and is connected by a multi-outlet fitting 140 to the oil discharge nozzles 142.

Vertical movement of the steam stack assembly including the outer conduit members 108, 112 and outer jacket 114 is guided by the guide frame assembly 144 which includes parallel, vertical posts 146 between which the float member 116 is disposed. A lower guide support 148 is secured to the posts and mounts guide rollers 150 in engagement with the outer jacket 114 which is welded to the float member 116. Thus, the float member is guided for vertical movement with the outer jacket 114 and the conduit 110 relative to the upper conduit member 118 which is engaged by guide rollers mounted by the upper guide support 152, enclosing the telescoping tubes 104 and 102. Vertical displacement of the upper conduit member 108 is limited by the upper and lower stop rings 154 and 156 engageable with the upper guide support 152. The upper conduit member 108 may be upwardly displaced from the lower limit position shown in FIGS. 7 and 9 to the upper limit position shown in FIG. 8, when engaged by the flange 158 secured to the conduit member 110 enclosing the dome 106, as the float member 116 is moving upwardly during rising tide conditions.

What is claimed as new is as follows:

1. Apparatus for purifying a liquid comprising a float member, vertically elongated conduit means supported by the float member having a lower portion projecting downwardly from the float member and adapted to project into a body of liquid and an upper portion projecting upwardly from the float member, frame means engageable with the conduit means for guiding vertical movement thereof in response to changes in level of the body of liquid, pressure operated means for circulating a fluent medium in direct contact with the liquid, means for heating said fluent medium to a temperature above the boiling point of the liquid, wherein said heated fluent material comes into direct contact with the liquid by exiting through the lower portion of said conduit means, thereby evaporating the liquid, means connected to said circulating means for conducting the vapor evaporated from the liquid into the upper portion of the conduit means, and condenser means communicated with the upper portion of the conduit means for condensing the vapor, said pressure operated circulating means including at least one insulated conduit member mounted within the lower portion of the conduit means, nozzle means discharging said fluent medium into the liquid within the insulated conduit member, said conduit member having an exit passage through which the fluent medium is conducted above the level of the body of liquid, intake means mounted within the conduit means for withdrawing the fluent medium collected above the level of the liquid, and pump means connected to the intake means and the nozzle means for inducing flow of the fluent medium therebetween.

2. The combination of claim 1 wherein said fluent medium is less dense than and immiscible with the liquid and has a higher boiling point temperature.

3. The combination of claim 2 including vapor conducting means fixedly mounted in telescoping relation to the upper portion of the conduit means.

4. The combination of claim 2 wherein said means circulating the fluent medium includes at least one heat exchange tube mounted within the conduit means having an exit passage through which the fluent medium is conducted above the surface of the liquid, nozzle means discharging said medium into the liquid within the heat exchange tube, intake means mounted within the conduit means for withdrawing the medium therefrom above said surface of the liquid and pump means interconnecting the intake means and the nozzle means for inducing flow of the medium therebetween externally of the conduit means.

5. The combination of claim 4 wherein said means for heating the medium heats the medium to a maximum temperature below the boiling point thereof and is disposed externally of the conduit means.

6. The combination of claim 5 wherein said maximum temperature is above the boiling point of the liquid.

References Cited
UNITED STATES PATENTS

| | | | |
|---|---|---|---|
| 3,138,546 | 6/1964 | Muller | 203—10X |
| 3,236,747 | 2/1966 | Margiloff | 203—11 |
| 3,351,536 | 11/1967 | Fox | 202—83 |
| 3,394,055 | 7/1968 | Ludwig | 203—10 |

WILBUR L. BASCOMB, JR., Primary Examiner

D. EDWARDS, Assistant Examiner

U.S. Cl. X.R.

202—237; 203—10, 100